United States Patent
Song et al.

(10) Patent No.: US 8,916,292 B2
(45) Date of Patent: Dec. 23, 2014

(54) POSITIVE ELECTRODE FOR LITHIUM RECHARGEABLE BATTERY AND LITHIUM RECHARGEABLE BATTERY INCLUDING THE SAME AND METHOD OF FABRICATING THE LITHIUM RECHARGEABLE BATTERY

(75) Inventors: Kyong-Hwan Song, Yongin-si (KR); Seok-Gyun Chang, Yongin-si (KR); Jung-Seog Kim, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 1459 days.

(21) Appl. No.: 11/723,525

(22) Filed: Mar. 20, 2007

(65) Prior Publication Data
US 2007/0243465 A1 Oct. 18, 2007

(30) Foreign Application Priority Data
Mar. 21, 2006 (KR) .................. 10-2006-0025593

(51) Int. Cl.
*H01M 4/13* (2010.01)
*H01M 4/1391* (2010.01)
(Continued)

(52) U.S. Cl.
CPC .......... *H01M 10/0525* (2013.01); *H01M 4/405* (2013.01); *H01M 4/1391* (2013.01); *H01M 4/626* (2013.01); *H01M 4/621* (2013.01); *Y02E 60/122* (2013.01); *H01M 4/622* (2013.01); *H01M 4/623* (2013.01); *H01M 4/582* (2013.01); *H01M 4/0404* (2013.01); *H01M 4/625* (2013.01); *H01M 4/502* (2013.01); *H01M 4/525* (2013.01); *H01M 4/5825* (2013.01); *H01M 4/624* (2013.01); *H01M 2004/027* (2013.01); *H01M 10/4235* (2013.01); *H01M 4/587* (2013.01); *H01M 4/62* (2013.01); *H01M 4/581* (2013.01); *H01M 4/485* (2013.01)
USPC .......................................................... 429/212

(58) Field of Classification Search
USPC .......................................................... 429/164
See application file for complete search history.

(56) References Cited

U.S. PATENT DOCUMENTS 6,045,952 A * 4/2000 Kerr et al. ................ 429/307
2004/0086774 A1 5/2004 Munoz et al.
(Continued)

FOREIGN PATENT DOCUMENTS

JP 05-266889 10/1993
JP 10-50305 * 7/1996
(Continued)

OTHER PUBLICATIONS

Korean Notice of Allowance issued by Korean Patent Office on Oct. 24, 2012 corresponding to Korean Patent Application No. 10-2006-0025593, and Request for Entry of the Accompanying Office Action attached herewith.

*Primary Examiner* — Ula C. Ruddock
*Assistant Examiner* — Jacob Marks
(74) *Attorney, Agent, or Firm* — Robert E. Bushnell, Esq.

(57) ABSTRACT

The present invention provides a positive electrode for a lithium rechargeable battery, a lithium rechargeable battery including the same, and a method of fabricating the lithium rechargeable battery. An antigelling agent is added in a positive electrode slurry to prevent gelation, and the positive electrode of the present invention is made with the antigelling agent added positive electrode slurry. During fabrication of the positive electrode by using a lithium nickel-based or manganese-based composite oxide for a positive electrode active material, gelation is prevented. A lithium rechargeable battery made with the positive electrode of the present invention shows a high capacity and excellent stability and reliability.

27 Claims, 3 Drawing Sheets

(51) Int. Cl.
*H01M 4/62* (2006.01)
*H01M 4/58* (2010.01)
*H01M 4/04* (2006.01)
*H01M 4/50* (2010.01)
*H01M 4/525* (2010.01)
*H01M 10/42* (2006.01)
*H01M 4/587* (2010.01)
*H01M 10/0525* (2010.01)
*H01M 4/40* (2006.01)
*H01M 4/02* (2006.01)
*H01M 4/485* (2010.01)

(56) References Cited

U.S. PATENT DOCUMENTS

2004/0093803 A1* 5/2004 Ito et al. .................. 51/309
2005/0274000 A1* 12/2005 Oh et al. .................. 29/623.3
2006/0019166 A1* 1/2006 Numata et al. ............ 429/224
2006/0172180 A1* 8/2006 Okamura et al. .......... 429/61
2006/0204855 A1* 9/2006 Saruwatari et al. ........ 429/324
2006/0222952 A1* 10/2006 Kono et al. ............. 429/231.95

FOREIGN PATENT DOCUMENTS

| | | |
|---|---|---|
| JP | 10-079244 | 3/1998 |
| JP | 2003-123755 | 4/2003 |
| KR | 1020000056532 A | 9/2000 |
| KR | 1020010082428 A | 8/2001 |
| KR | 1020050097231 A | 10/2005 |
| KR | 1020060008568 A | 1/2006 |
| KR | 10-2006-0098787 A | 9/2006 |
| KR | 10-2006-0098789 A | 9/2006 |

* cited by examiner

POSITIVE ELECTRODE FOR LITHIUM RECHARGEABLE BATTERY AND LITHIUM RECHARGEABLE BATTERY INCLUDING THE SAME AND METHOD OF FABRICATING THE LITHIUM RECHARGEABLE BATTERY

CLAIM OF PRIORITY

This application makes reference to, incorporates the same herein, and claims all benefits accruing under 35 U.S.C. §119 from an application for ANODE FOR LITHIUM RECHARGEABLE BATTERY AND LITHIUM RECHARGEABLE BATTERY INCLUDING THE SAME AND METHOD OF FABRICATING THE LITHIUM RECHARGEABLE BATTERY earlier filed in the Korean Intellectual Property Office on the 21 of Mar. 2006 and there duly assigned Serial No. 10-2006-0025593.

BACKGROUND OF THE INVENTION

1. Field of the Invention

The present invention relates to a positive electrode for a lithium rechargeable battery, a lithium rechargeable battery including the same, and a method of fabricating the lithium rechargeable battery. More particularly, the present invention relates to a positive electrode for a lithium rechargeable battery, a lithium rechargeable battery including the same, and a method of fabricating the lithium rechargeable battery, which has a high capacity and prevents gelation phenomenon that occurs during fabrication of a positive electrode by using a lithium nickel-based or manganese-based composite oxide for a positive electrode active material.

2. Description of the Prior Art

As electronics, communication, and computer industries are rapidly developed in recent years, their equipments become small in size, light in weight, and highly integrated. Portable electronic equipments, such as camcorders, cellular phones, and laptop computers, have been popular. Accordingly, demand for a lightweight, durable, and reliable battery has increased. In particular, because a lithium rechargeable battery can be quickly charged, and its energy density per unit weight is three times higher than those of a lead acid battery, a nickel-cadmium battery, a nickel-hydrogen battery, and a nickel-zinc battery, research and development have been intensively conducted on the lithium rechargeable battery.

The lithium rechargeable battery includes a positive electrode and a negative electrode. The positive electrode has a positive electrode collector, and the negative electrode has a negative electrode collector. Positive electrode and negative electrode active material layers, which include intercalatable and deintercalatable materials of lithium ions, are formed on surfaces of collectors of the positive electrode and negative electrode. A separator is interposed between the positive electrode and the negative electrode. An organic electrolyte is filled in a space formed between the positive electrode and negative electrode. The lithium rechargeable battery produces electric energy by oxidation and reduction reaction when the lithium ions are intercalated/deintercalated at the positive electrodes and negative electrodes.

A lithium metal has been used for a negative electrode active material of the lithium rechargeable battery. The lithium rechargeable battery, if the lithium metal is used, can be explosive in a short-circuit of the battery due to the formation of a dendrite. Therefore, a carbon-based material such as amorphous carbon or crystalline carbon is used as a substitution for the lithium metal.

For a positive electrode active material of the lithium rechargeable battery, a lithium composite oxide, which includes a transition metal and lithium having an intercalatable structure such as $LiCoO_2$, $LiMn_2O_4$, and $LiNiMO_2$ (M is two-valence or three-valence metal), has been mainly used. The lithium composite oxide such as $LiCoO_2$ or $LiNiMO_2$ (M is two-valence or three-valence metal) is made by mixing a lithium compound such as lithium carbonate and lithium hydroxide with a cobalt compound such as cobalt oxide and cobalt carbonate or a nickel compound including $NiM(OH)_2$ or its oxide. In the mixture for the lithium composite oxide, the ratio of Li to Co or Li to Ni is approximately 1:1, and the mixture is baked for 7 to 25 hours at temperature of 600° C. to 1000° C. In the lithium composite oxide made in the above mentioned processes, non-reacted lithium compound remains on the surface, and positive electrode active material slurry is formed, causing a gelation problem. Furthermore, the non-reacted lithium compound forms lithium carbonate by reacting with $CO_2$ of the atmosphere, and the lithium carbonate is decomposed at a high temperature producing gas in the battery, which may degrade the characteristics of the battery.

In particular, if a high alkaline positive electrode active material is mixed with a polyvinylidene fluoride (PVdF) binder, then a continuous reaction of decomposing HF is progressed. It is speculated that this reaction is also accompanied by high-grade amine series such as γ-butyrolactone, which is an alkaline impurity of N-methyl-2-pyrrolidone (NMP) used as a solvent, methylamine, dimethylamine, and trimethylamine, or is accompanied by a polymer such as a dimer and a trimer, which is polymerized by the modification of the NMP. If active oxygen or water is contacted with the formed double bonding chain, functional groups are introduced, and viscosity increases during the mixing process of the slurry, and thus gelation phenomenon occurs. The increase of viscosity depends on the degree of hydrogen bonding and crosslinking between the functional groups. If the amount of the residual moisture in the PVdF binder solution is large, such a reaction is rapidly progressed.

Because a battery capacity per unit weight of the lithium nickel-based composite oxide or the lithium manganese-based composite oxide is higher than that of another lithium-containing metal oxide, lithium nickel-based composite oxide or the lithium manganese-based composite oxide has an advantage for the high capacity lithium rechargeable battery. However, because the lithium nickel-based composite oxide or the lithium manganese-based composite oxide has high alkalinity, and causes a gelation phenomenon of positive electrode active material slurry, it is practically difficult to use the lithium nickel-based composite oxide or the lithium manganese-based composite oxide in a rechargeable battery.

Japanese laid-open Patent Publication No. 1993-266889 proposes to minimize the formation of lithium carbonate by plasticizing Co and Li in the ratio of Co to Li that is lower than one. However, in case of using this method, a non-reacted Co or Ni compound remains, and the battery capacity decreases.

Japanese laid-open Patent Publication No. 1998-79244 proposes to make slurry by adding an organic acid during fabrication of slurry of an positive electrode active material. However, in case of using this method, the aforementioned problem is not sufficiently resolved because the active material absorbs $CO_2$ or water before being fabricated into the slurry.

Japanese laid-open Patent Publication No. 2003-123755 proposes to make neutral lithium salt on the surface of an active material by treating the surface with acid. However, in case of using this method, an electrochemical property of the battery, in particular a high rate discharge capability, deteriorates, because the surface of the active material is damaged and the amount of lithium used during actual charging and discharging operations is reduced.

SUMMARY OF THE INVENTION

The present invention provides a solution for the aforementioned problems of a lithium rechargeable battery. An aspect of the present invention is to provide a positive electrode for a lithium rechargeable battery and a lithium rechargeable battery including the same and a method of fabricating the lithium rechargeable battery which has a high capacity and can prevent gelation phenomenon that occurs during fabrication of a positive electrode by using a lithium nickel-based or manganese-based composite oxide for a positive electrode active material.

A positive electrode for a lithium rechargeable battery for accomplishing the aforementioned aspect of the present invention includes a positive electrode collector, and a positive electrode active material layer formed on at least one side of the positive electrode collector. The positive electrode active material layer includes a positive electrode active material that includes a lithium compound which intercalates and deintercalates a lithium ion, a binder, and an antigelling agent containing sulfonate group (—SO$_3$H—). The antigelling agent may include naphthaline-sulfonic acid. The amount of the antigelling agent is about 0.1 wt % to about 5 wt % with respect to the weight of the positive electrode active material.

The positive electrode active material may include a lithium compound such as $Li_xMn_{1-y}M_yA_2$, $Li_xMn_{1-y}M_yO_{2-z}X_z$, $Li_xMn_{2-y}O_{4-z}X_z$, $Li_xMn_{2-y}M_yM'_zA_4$, $Li_xNi_{1-y}M_yA_2$, $Li_xNi_{1-y}M_yO_{2-z}X_z$, $Li_xNi_{1-y}Co_yO_{2-z}X_z$, $Li_xNi_{1-y-z}Co_yM_zA_a$, $Li_xNi_{1-y-z}Co_yM_zO_{2-a}X_a$, $Li_xNi_{1-y-z}Mn_yM_zA_a$, or $Li_xNi_{1-y-z}Mn_yM_zO_{2-a}X_a$, where $0.9 \le x \le 1.1$, $0 \le y \le 0.5$, $0 \le z \le 0.5$ and $0 \le a \le 2$. Each of M and M' is a material such as magnesium (Mg), aluminum (Al), cobalt (Co), potassium (K), sodium (Na), calcium (Ca), silicon (Si), titanium (Ti), tin (Sn), vanadium (V), germanium (Ge), gallium (Ga), boron (B), arsenic (As), zirconium (Zr), manganese (Mn), chromium (Cr), iron (Fe), strontium (Sr), or the rear-earth elements. A is an element such as oxygen (O), fluorine (F), sulfur (S), or phosphorus (P). X is an element such as fluorine (F), sulfur (S), or phosphorus (P).

The binder may include a material such as polyvinylidene fluoride, copolymer (P(VdF/HFP)) of polyhexafluoropropylene-polyvinylidene fluoride, poly(vinyl acetate), polyvinyl alcohol, polyethylene oxide, polyvinyl pyrrolidone, alkylated polyethylene oxide, polyvinyl ether, poly(methyl metacrylate), poly(ethyl acrylate), polytetrafluoroethylene, polyvinyl chloride, polyacrylonitrile, polyvinylpyridine, styrene-butadiene rubber, or acrylonitrile-butadiene rubber. The amount of the binder is between about 1 wt % and about 10 wt % with respect to the weight of the positive electrode active material.

The positive electrode active material layer further may include a conductive material. The conductive material may include a material such as a graphite-based material, a carbon black-based material, an electrically conductive fiber, a metal powder, an electrically conductive metal oxide, an electrically conductive polymer, a metal, a metal compound, or mixtures thereof. The graphite-based material may include artificial graphite or natural graphite. The carbon black-based material may include a material such as acetylene black, ketjen black, denka black, thermal black, or channel black. The electrically conductive fiber may include carbon fiber or metal fiber. The metal powder may include a material such as copper, nickel, aluminum, or silver. The electrically conductive metal oxide may include titanium oxide. The electrically conductive polymer may include a material polyaniline, polythiophene, polyacetylene, or polypyrrole. The metal compound may include perovskite material such as tin, tin oxide, tin phosphate (SnPO$_4$), titanium oxide, potassium titanate, LaSrCoO$_3$, or LaSrMnO$_3$. The amount of the conductive material is between about 0.1 wt % and about 10 wt % with respect to the weight of the positive electrode active material, and preferably between about 1 wt % to about 5 wt % with respect to the weight of the positive electrode active material.

The present invention provides a lithium rechargeable battery that includes a positive electrode including a positive electrode collector and a positive electrode active material layer formed on at least one side of the positive electrode collector, a negative electrode including a negative electrode active material that intercalates and deintercalates lithium ion, and an electrolyte which transfers the lithium ion. The electrolyte contacting each of the positive electrode and the negative electrode. The positive electrode active material layer includes a positive electrode active material including a lithium compound which intercalates and deintercalates a lithium ion, a binder, and an antigelling agent containing sulfonate group (—SO$_3$H—).

A method of fabricating the lithium rechargeable battery of the present invention is provided. The method includes steps of fabricating a positive electrode slurry by mixing a positive electrode active material with a binder and an antigelling agent, coating at least one side of a positive electrode collector with the positive electrode slurry, and drying and rolling the coated positive electrode slurry. The positive electrode active material intercalates and deintercalates lithium ion, and the positive electrode active material includes a lithium compound that includes nickel (Ni) or manganese (Mn). The antigelling agent includes sulfonate group (—SO$_3$H—). The antigelling agent may include naphthaline-sulfonic acid.

The step of fabricating the positive electrode slurry may further include a step of adding a conductive material into the positive electrode slurry. The amount of antigelling agent mixed in the positive electrode slurry is about 0.1 wt % to 5 wt % with respect to the weight of the positive electrode slurry.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
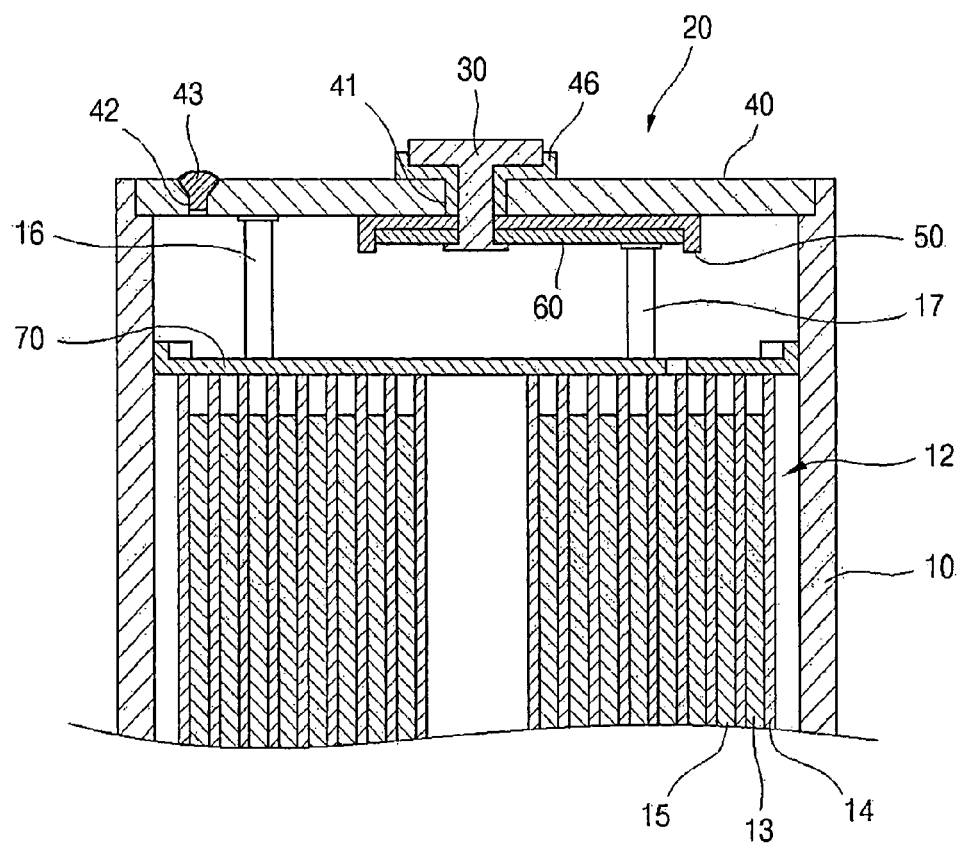
FIG. 1 is a sectional view illustrating a lithium rechargeable battery constructed as an embodiment of the present invention.

The present invention now will be described more completely hereinafter with reference to the accompanying drawings, in which exemplary embodiments of the invention are shown. This invention may, however, be embodied in many different forms and should not be construed as limited to the embodiments set forth herein. Through these embodiments, this disclosure will be thorough and complete, and will fully convey the scope of the invention to those having skill in the art.

A lithium rechargeable battery of the present invention includes a positive electrode, a negative electrode and a non-aqueous electrolyte. The positive electrode includes a positive electrode collector and a positive electrode active material layer. Lithium ions are absorbed into or released from the positive electrode active material layer. The positive electrode can be made by applying a slurry composition to the positive electrode collector, and drying and rolling the slurry-coated positive electrode collector. The slurry composition is made by dispersing an positive electrode active material, a binder, a naphthaline-sulfonic acid antigelling agent, and, if necessary, a thickener and a conductive material in a solvent.

A metal such as aluminum, copper, nickel, silver, stainless steel, or their alloys can be used as the positive electrode collector. Typically, aluminum or its alloy is used for the positive electrode collector.

The positive electrode active material is preferably a lithium compound including nickel (Ni) or manganese (Mn) for high battery capacity. A lithium-containing compound such as $Li_xMn_{1-y}M_yA_2$, $Li_xMn_{1-y}M_yM_yO_{2-z}X_z$, $Li_xMn_2O_{4-z}X_z$, $Li_xMn_{2-y}M_yM'_zA_4$, $Li_xNi_{1-y}M_yA_2$, $Li_xNi_{1-y}M_yO_{2-z}X_z$, $Li_xNi_{1-y-z}Co_yO_{2-z}X_z$, $Li_xNi_{1-y-z}Co_yM_zA_a$, $Li_xNi_{1-y-z}Co_yM_zO_{2-a}X_a$, $Li_xNi_{1-y-z}Mn_yM_zA_a$, or $Li_xNi_{1-y-z}Mn_yM_zO_{2-a}X_a$ can be preferably used for the positive electrode active material. In the lithium-containing compounds listed above, $0.9 \leq x \leq 1.1$, $0 \leq y \leq 0.5$, $0 \leq z \leq 0.5$, and $0 \leq a \leq 2$. Each of M and M' is a material such as magnesium (Mg), aluminum (Al), cobalt (Co), potassium (K), sodium (Na), calcium (Ca), silicon (Si), titanium (Ti), tin (Sn), vanadium (V), germanium (Ge), gallium (Ga), boron (B), arsenic (As), zirconium (Zr), manganese (Mn), chromium (Cr), iron (Fe), and strontium (Sr), or the rear-earth elements. A is an element such as oxygen (O), fluorine (F), sulfur (S), or phosphorus (P). X is an element such as fluorine (F), sulfur (S), or phosphorus (P).

The binder is a material which makes the active materials in a form of paste, bonds the active materials to each other, bonds the active materials to the collectors, and buffers the expansion and contraction of the active materials. For example, polyvinylidene fluoride, copolymer (P(VdF/HFP)) of polyhexafluoropropylene-polyvinylidene fluoride, poly(vinyl acetate), polyvinyl alcohol, polyethylene oxide, polyvinyl pyrrolidone, alkylated polyethylene oxide, polyvinyl ether, poly(methyl metacrylate), poly(ethyl acrylate), polytetrafluoroethylene, polyvinyl chloride, polyacrylonitrile, polyvinylpyridine, styrene-butadiene rubber, acrylonitrile-butadiene rubber, or the like can be used for the binder. It is preferred that the content of the binder is approximately 1 wt % to 10 wt % with respect to the weight of the positive electrode active material. If the content of the binder is less than 1 wt %, the bonding force between the active material and the collector may not be strong enough. If the content of the binder is higher than 10 wt %, the bonding force is strong, but the content of the active material is relatively reduced, which may be disadvantageous for high battery capacity.

The conductive material is a material which improves the electron conductivity. The conductive material can be a material such as a graphite-based material, a carbon black-based material, an electrically conductive fiber, a metal powder, an electrically conductive metal oxide, an electrically conductive polymer, a metal, or a metal compound. Examples of the graphite-based conductive material include an artificial graphite, natural graphite, or the like. Examples of the carbon black-based conductive material include acetylene black, ketjen black, denka black, thermal black, channel black, or the like. Examples of the conductive material made by the electrically conductive fiber include carbon fiber, metal fiber, or the like. Examples of the conductive material made by the metal powder include copper, nickel, aluminum, silver, or the like. Examples of the conductive material made by the electrically conductive metal oxide include titanium oxide or the like. Examples of the conductive material made by the electrically conductive polymer include polyaniline, polythiophene, polyacetylene, polypyrrole, or the like. Examples of the conductive material made by the metal or the metal compound include perovskite material or the like such as tin, tin oxide, tin phosphate ($SnPO_4$), titanium oxide, potassium titanate, $LaSrCoO_3$, or $LaSrMnO_3$. However, the materials for the conductive material are not limited to the aforementioned materials.

The amount of the conductive material is 0.1 wt % to 10 wt %, and preferably 1 wt % to 5 wt % with respect to the weight of the positive electrode active material. If the content of the conductive material is less than 0.1 wt %, an electrochemical property deteriorates. If the content of the conductive material is higher than 10 wt %, energy density per weight deteriorates.

The material of the thickener is not specifically limited as long as the material can control the viscosity of the active material slurry. Examples of the thickener, however, include carboxymethyl cellulose, hydroxymethyl cellulose, hydroxyethyl cellulose, hydroxypropyl cellulose, or the like.

The antigelling agent is added so as to prevent the gelling between the active material particles, which can be caused by moisture. In a high alkaline active material such as nickel or manganese, moisture is adsorbed on the surface of the particle, and the gelation is rapidly progressed with time. Because the positive electrode slurry becomes semi-solid state after the gelation, a subsequent slurry coating and drying/rolling process is difficult to be processed.

Figure 2:
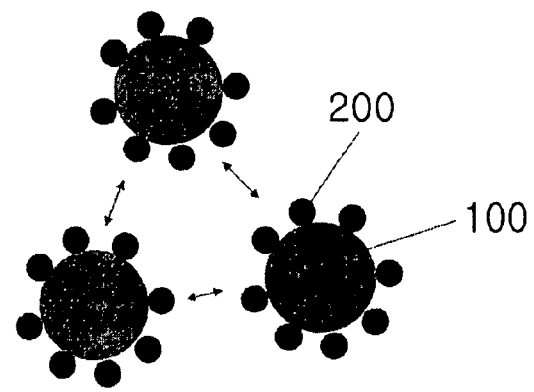
FIG. 2 is a diagram illustrating positive electrode active material particles to which an antigelling agent of the present invention is added.

FIG. 2 is a diagram illustrating positive electrode active material particles and an antigelling agents of the present invention, which adhere to the active material particles. Referring to FIG. 2, antigelling agents 200 are adsorbed on the surface of active material particle 100, and produce mutually repulsive force from each other. Antigelling agent 200 exhibits an electric double layer effect by the balance of hydrophilic group and hydrophobic group. In this way, the antigelling agents fluidize the positive electrode slurry, which helps the subsequent process to be smoothly progressed. The antigelling agent can be a material that contains sulfonate group ($-SO_3H-$).

A surfactant can be used for the antigelling agent. The surfactant includes an anionic surfactant which ionizes in an aqueous solution and becomes an anion, a cationic surfactant which ionizes and becomes a cation, an amphoteric surfactant which becomes an anion and a cation, or non-ionic surfactant which does not ionize. In the present invention, the cationic surfactant or the anionic surfactant is preferred, because these surfactant show excellent properties of being adsorbed on the surface of the active material particle and generating mutual repulsive force. The cationic surfactant includes amine salt (R3NHX→R3NH⁺+X⁻, X is Br or Cl), quaternary ammonium salt ([NR4]X→[NR4]⁺+X⁻), or the like. The anion surfactant includes soap (RCOOM→RCOO⁻+M⁺), alcohol sulfate ester salt (ROSO₃Na→ROSO₃⁻+Na⁺), alkyl/alkylaryl sulfonic acid salt (R—C₆H₄—SO₃Na→R—C₆H₄—SO₃⁻+Na⁺), or the like. Naphthaline-sulfonic acid, which is an organic dispersing agent, can be used for the surfactant. In the naphthaline-sulfonic acid, water or an organic solvent can be used for a solvent. The chemical formula of the naphthaline-sulfonic acid is shown in Formula 1.

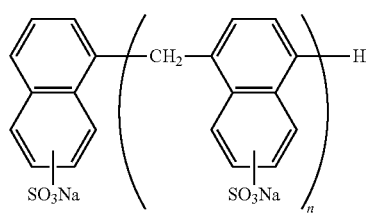

[Formula 1]

The amount of the antigelling agent is 0.1 wt % to 5 wt % with respect to the weight of the positive electrode active material. If the amount of the antigelling agent is smaller than 0.1 wt %, the amount of the antigelling agent is too low to prevent the gelation. On the other hand, if the amount of the antigelling agent is greater than 5 wt %, gas is excessively produced, and the antigelling agent causes a side reaction with electrolyte. Therefore, performance of the battery can deteriorate.

In experiments, various amounts of the naphthaline-sulfonic acid surfactant were added to the nickel manganese-based positive electrode slurry to make slurry mixtures, and the viscosities of the slurry mixtures were measured with respect to elapsed time. The weight percentages of the naphthaline-sulfonic acid surfactant based on the weight of the positive electrode slurry, which were used in the experiments, were 0.0% cp, 0.3% cp and 0.4% cp. The measurement results are shown in FIG. 6.

Figure 6:
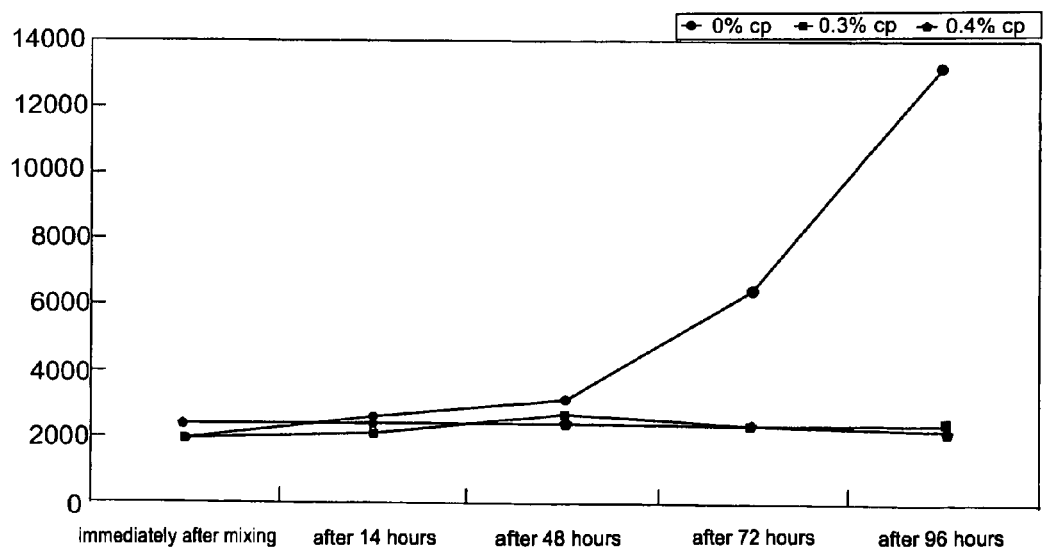
FIG. 6 is a graph showing results of viscosity measurements of positive electrode slurries with various amounts of surfactant.

Referring to FIG. 6, in case of the positive electrode slurry that does not include the surfactant, the viscosity increases for the first 48 hours at slow rate, and rapidly increases after the 48 hours. On the other hand, in case of the positive electrode slurry that includes 0.3 wt % or 0.4 w % of surfactant, the viscosity constantly maintains at low level regardless of the amount of the elapsed time.

The negative electrode includes a negative electrode active material which can intercalate and deintercalate lithium ion. The negative electrode can be made by coating a negative electrode collector with a slurry compound. The slurry compound can be made by dispersing the negative electrode active material, a binder, a conductive material, and, if necessary, a thickener in a solvent.

The negative electrode active material includes a material or materials that can reversibly intercalate and deintercalalte lithium ions, or a metal material which is capable of being alloyed with lithium or their mixture. The material that can reversibly intercalate and deintercalate lithium may include artificial graphite, natural graphite, graphite carbon fiber, graphite mezo carbon micro bead, fullerene, or amorphous carbon. The amorphous carbon includes hard carbon, cokes, MCMB, or MPCF that are plasticized at temperature below 1500° C. It is preferable that the carbon-based material has an d002 interplanar distance of 3.35 Å to 3.38 Å, and a crystallite size (Lc) by X-ray diffraction of at least 20 nm. The metal which is capable of being alloyed with lithium may include aluminum (Al), silicon (Si), tin (Sn), lead (Pb), zinc (Zn), bismuth (Bi), indium (In), magnesium (Mg), gallium (Ga), cadmium (Cd), and germanium (Ge). These metal materials can be used alone or by mixing or alloying them. The metal can be used as a composite that is mixed with the carbon-based material.

A negative electrode is formed by applying a negative electrode slurry, which is obtained by mixing and dispersing a negative electrode mixture in a solvent, to a negative electrode collector, and drying and rolling the slurry-coated negative electrode collector. For the solvent, a non-aqueous solvent or an aqueous solvent is used. The non-aqueous solvent includes N-methyl-2-pyrrolidone (NMP), dimethyl formamide, dimethyl acetamide, N,N-dimethylamino propylamine, ethylene oxide, tetrahydrofuran, or the like.

The negative electrode collector can be punching metal, X-punching metal, gold foil, metal foam, trabecular metal fiber sintering metal, nickel foil, copper foil, or the like.

The materials of the binder, the conductive material, and the thickener can be the same as those of the positive electrode active material slurry.

The non-aqueous electrolyte includes lithium salt and a non-aqueous organic solvent, and can further include an additive for improving the charging and discharging characteristic and preventing over-charging. The lithium salt operates as a source of lithium ion in the battery, and allows the basic operation of the lithium battery. The non-aqueous organic solvent functions as a medium, through which ions involved in the electrochemical reaction of the battery move.

The lithium salt may be any material or mixtures of the materials such as LiPF₆, LiBF₄, LiSbF₆, LiAsF₆, LiClO₄, LiCF₃SO₃, LiN(SO₂CF₃)₂, LiN(SO₂C₂F₅)₂, LiC(SO₂CF₃)₃, LiN(SO₃CF₃)₂, LiC₄F₉SO₃, LiAlO₄, LiAlCl₄, LiCl, or LiI. The concentration of the lithium salt is preferably 0.6M to 2.0M, and more preferably, 0.7M to 1.6M. If the concentration of the lithium salt is lower than 0.6M, the conductivity of the electrolyte becomes lower, and thus the performance of the electrolyte deteriorates. On the other hand, if the concentration of the lithium salt is higher than 2.0M, the viscosity of the electrolyte increases, and thus the mobility of the lithium ion is lowered. For the non-aqueous organic solvent, carbonate, ester, ether or ketone can be used alone or by mixing them. Dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), or the like can be used for the carbonate, and γ-butyrolactone (GBL), n-methyl acetate, n-ethyl acetate, n-propyl acetate, or the like can be used for the ester. Dibutyl ether or the like can be used for the ether, but not limited thereto.

In case of the carbonate-based solvent among the non-aqueous organic solvent, it is preferred to use the mixture of cyclic carbonate and chain carbonate. In this case, it is preferred that the cyclic carbonate and the chain carbonate are mixed in the volume ratio of the cyclic carbonate to the chain carbonate that is from 1:1 to 1:9. In this volume ratio, the performance of the electrolyte can be optimized.

The non-aqueous organic solvent can further include an aromatic hydrocarbon organic solvent. Benzene, fluorobenzene, bromobenzene, chlorobenzene, cyclohexylbenzene, isopropylbenzene, n-butylbenzene, octylbenzene, toluene, xylene, mesitylene, or the like can be used for the aromatic hydrocarbon organic solvent. These materials can be used alone or by mixing them. It is preferred that the volumetric ratio of the carbonate solvent to the aromatic hydrocarbon organic solvent in the electrolyte containing the aromatic hydrocarbon organic solvent is from 1:1 to 30:1, in order to optimize the performance of the electrolyte.

The lithium rechargeable battery can include a separator for preventing a short between the positive electrode and negative electrode, and for providing a transfer passage of the lithium ions. For the separator, materials such as polyolefin polymer film including polypropylene, polyethylene, polyethylene/polypropylene, polyethylene/polypropylene/polyethylene, polypropylene/polyethylene/polypropylene, the like, or their multi-film, microporous film, woven fabric, or non-woven fabric can be used. A film made by coating a resin having excellent stability on a porous polyolefin film can be used.

FIG. 1 is a sectional view illustrating a lithium rechargeable battery constructed as an embodiment of the present invention. Referring to FIG. 1, the lithium rechargeable battery is formed by inserting electrode assembly 12 into can 10. Electrode assembly 12 includes positive electrode 13, negative electrode 15, and separator 14. Electrolyte is filled in can 10. The upper part of can 10 is sealed with cap assembly 20. Cap assembly 20 includes cap plate 40, insulation plate 50, terminal plate 60, and electrode terminal 30. Cap assembly 20 is coupled with insulation case 70, and seals can 10.

Electrode terminal 30 is inserted into terminal through-hole 41 formed on the center of cap plate 40. When electrode terminal 30 is inserted into terminal through-hole 41, tubular gasket 46 coupled with the outside surface of electrode terminal 30 is inserted together with electrode terminal 30 in order to insulate electrode terminal 30 from cap plate 40. After cap assembly 20 is assembled on the upper part of can 10, the electrolyte is injected through electrolyte injection hole 42, and electrolyte injection hole 42 is closed by plug 43.

Electrode terminal 30 is coupled with negative electrode tab 17 of negative electrode 15 or positive electrode tab 16 of positive electrode 13, and works as a negative electrode terminal or a positive electrode terminal. The lithium rechargeable battery of the present invention is not limited to the aforementioned shape. The lithium rechargeable battery can be formed in various shapes including cylindrical shape, pouch shape, or the like.

Hereinafter, a method of fabricating the lithium rechargeable battery of the present invention will be briefly described.

A method of fabricating the lithium rechargeable battery of the present invention includes steps of fabricating an anode slurry, coating the anode slurry, drying and rolling the anode slurry, fabricating a cathode plate, fabricating an electrode assembly, inserting the electrode assembly in a can, sealing the can, and injecting an electrolyte in the can. Because the steps of fabricating a cathode plate, fabricating an electrode assembly, inserting the electrode assembly, sealing the can, and injecting the electrolyte are similar to manufacturing processes of the general lithium rechargeable battery, the detailed explanation thereabout will be omitted.

The step of fabricating the anode slurry includes a step of mixing an anode active material with a binder and a surfactant. The anode active material can intercalate and deintercalate lithium ions, and includes a lithium compound including nickel (Ni) or manganese (Mn). The step of fabricating the anode slurry can further include a step of adding a conductive material. Here, the step of adding the conductive material may be a step of adding a material such as artificial graphite, natural graphite, acetylene black, ketjen black, denka black, thermal black, channel black, carbon fiber, metal fiber, copper powder, nickel powder, aluminum powder, silver powder, titanium oxide, polyaniline, polythiophene, polyacetyl, polypyrrole, or mixtures thereof. The step of fabricating the anode slurry is preferably carried out so that the weight ratio of the surfactant is at least 0.1 wt % to 5 wt %.

A method of fabricating the lithium rechargeable battery of the present invention includes steps of fabricating a positive electrode slurry, coating the positive electrode slurry, drying and rolling the positive electrode slurry, fabricating a negative electrode plate, fabricating an electrode assembly, inserting the electrode assembly in a can, sealing the can, and injecting an electrolyte in the can. Because the steps of fabricating a negative electrode plate, fabricating an electrode assembly, inserting the electrode assembly, sealing the can, and injecting the electrolyte are similar to manufacturing processes of the general lithium rechargeable battery, the detailed explanation thereabout will be omitted.

The step of fabricating the positive electrode slurry includes a step of mixing a positive electrode active material with a binder and a surfactant. The positive electrode active material can intercalate and deintercalate lithium ions, and includes a lithium compound including nickel (Ni) or manganese (Mn). The step of fabricating the positive electrode slurry can further include a step of adding a conductive material. Here, the step of adding the conductive material may be a step of adding a material such as artificial graphite, natural graphite, acetylene black, ketjen black, denka black, thermal black, channel black, carbon fiber, metal fiber, copper powder, nickel powder, aluminum powder, silver powder, titanium oxide, polyaniline, polythiophene, polyacetyl, polypyrrole, or mixtures thereof. The step of fabricating the positive electrode slurry is preferably carried out so that the weight ratio of the surfactant is at least 0.1 wt % to 5 wt %.

The step of coating the positive electrode slurry includes a step of coating the positive electrode slurry on at least one side of the positive electrode collector. The step of drying and rolling the positive electrode slurry includes a step of drying and rolling the coated positive electrode slurry by a drier and a roller.

Hereinafter, preferred embodiments and comparative examples of the present invention will be described. However, the following embodiments are merely exemplary embodiments of the present invention, and the present invention is not limited to the following embodiments.

Comparative Example 1

After mixing $LiNiO_2$, which is a positive electrode active material, with a carbon conductive material (Super P) and polyvinylidene fluoride (PVdF), which is a binder, in the weight ratio of 94:3:3, positive electrode slurry was made by dispersing the mixture in N-methyl-2-pyrrolidone (NMP). The positive electrode slurry was kept in a state of being opened.

Comparative Example 2

After fabricating positive electrode slurry in the same manner as described in the Comparative Example 1, the positive electrode slurry was kept in a closed container, and was kept in a state not being contacted with air and moisture.

Example 1

When fabricating the positive electrode slurry, 1 wt % of naphthaline-sulfonic acid was added as a surfactant. Except for adding the surfactant, the positive electrode slurry was treated in the same manner as described in the Comparative Example 1.

Example 2

When fabricating the positive electrode slurry, 1 wt % of naphthaline-sulfonic acid was added as a surfactant. Except for adding the surfactant, the positive electrode slurry was treated in the same manner as described in the Comparative Example 2.

Change of Viscosity with Respect to Time

Figure 3:
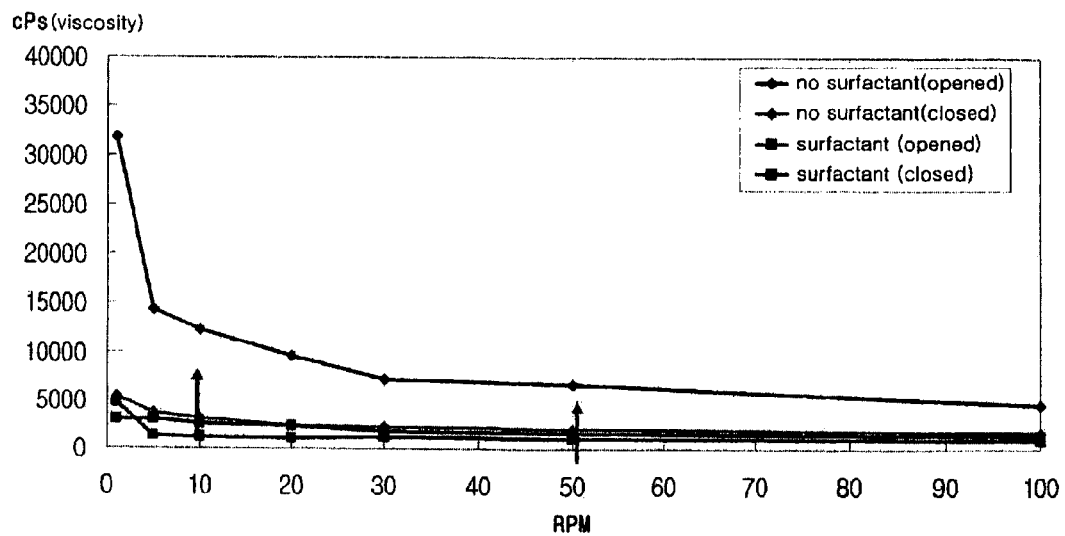
FIG. 3 is graph showing results of viscosity measurements of positive electrode slurries of Comparative Examples and Examples after one day from the fabrication.

Positive electrode slurry was mixed by the use of a blade that revolved at a certain rotational speed. After fabricating the positive electrode slurries of the Comparative Examples 1 and 2, and the Examples 1 and 2 by changing the rotational speed, the positive electrode slurries were kept for one day, and their viscosities of the slurries were measured. FIG. 3 shows the changes of viscosities of the positive electrode slurries of Comparative Examples 1 and 2, and the Examples 1 and 2 as a function of the rotational speed. The horizontal axis denotes the rotational speed (rpm), and the vertical axis denotes the viscosity (cPs). Referring to FIG. 3, the viscosity of the positive electrode slurry in the Comparative Example 1, which is exposed to air and does not includes a surfactant, is approximately five times higher than those of other samples. In particular, at a low rotational speed, the viscosity was considerably high. The increase in the viscosity at a high rotational speed shows that the positive electrode slurry, which initially had excellent fluidity, is gelated with time. Moreover, in case of the Comparative Example 2, in which the positive electrode slurry was kept in a closed state, the viscosity thereof is also higher than those of the positive electrode slurries in the Examples 1 and 2 to which the surfactant was added.

Figure 4:
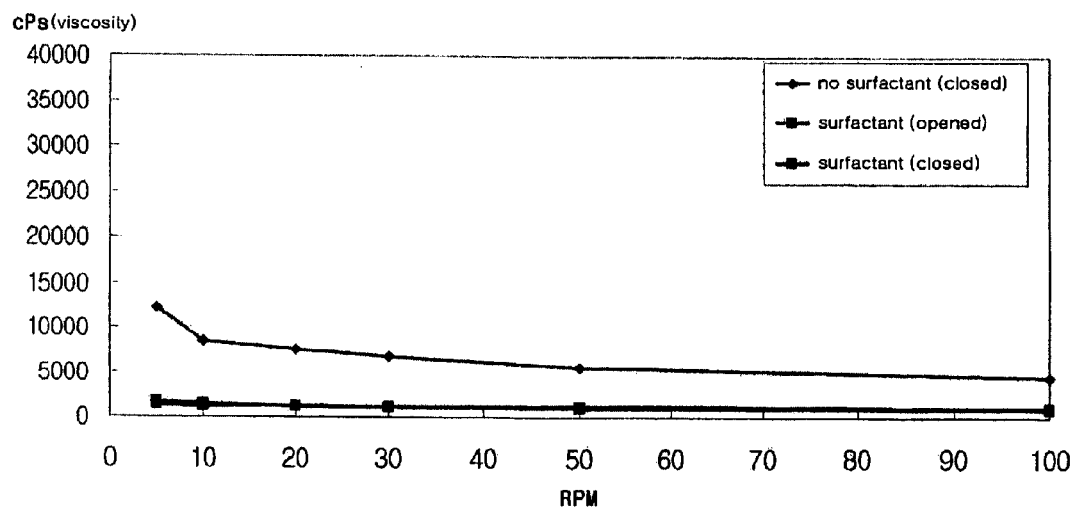
FIG. 4 is graph showing results of viscosity measurements of positive electrode slurries of Comparative Examples and Examples after three days from the fabrication.

After fabricating the positive electrode slurries of the Comparative Examples 1 and 2, and the Examples 1 and 2 by changing a rotational speed, the positive electrode slurries were kept for three days, and viscosities of the slurries were measured. FIG. 4 shows the changes of viscosities of the positive electrode slurries of Comparative Example 2, and the Examples 1 and 2 as a function of the rotational speed. For the positive electrode slurry of the Comparative Example 1 in which the positive electrode slurry was exposed to air, the viscosity increased excessively, and therefore the result with the positive electrode slurry of the Comparative Example 1 is not depicted in FIG. 4. Referring to FIG. 4, the viscosity of the positive electrode slurry in the Comparative Example 2, which was kept in a closed state and did not include a surfactant, is approximately four times higher than those in Examples 1 and 2 over the entire range of the rotational speed. On the other hand, the positive electrode slurries in the Examples 1 and 2 maintain low and constant viscosities over the rotational speed.

Figure 5:
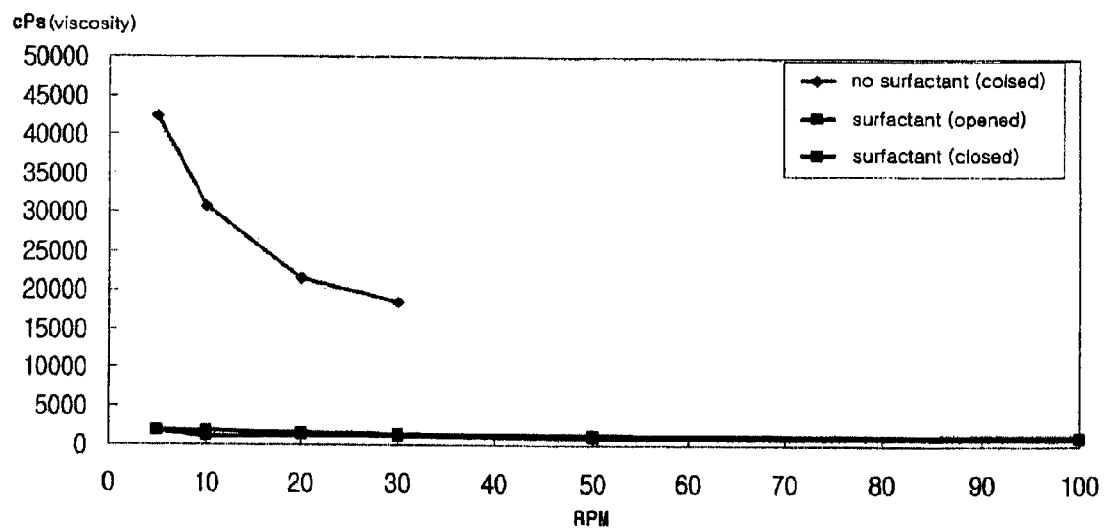
FIG. 5 is graph showing results of viscosity measurements of positive electrode slurries of Comparative Examples and Examples after five days from the fabrication.

After fabricating the positive electrode slurries of the Comparative Example 2, and the Examples 1 and 2 by changing a rotational speed, the positive electrode slurries were kept for five days, and viscosities of the slurries were measured. FIG. 5 shows the changes of viscosities of the positive electrode slurries of Comparative Example 2, and the Examples 1 and 2 as a function of the rotational speed. The result of the positive electrode slurry of the Comparative Example 1, in which the positive electrode slurry was exposed to air, is not depicted in FIG. 5 with the same reason described referring to FIG. 4. Referring to FIG. 5, the viscosity of the positive electrode slurry in the Comparative Example 2, which was kept in a closed state and did not include a surfactant, is rapidly increased in comparison with the slurries of the Examples 1 and 2. It was not possible to measure the viscosity at the rotational speed above 30 rpm in the positive electrode slurry of the Comparative Example 2. On the other hand, the positive electrode slurries in the Examples 1 and 2 maintain low and constant viscosities over the rotational speed. As a result, it is found that if the surfactant is added, the gelation of the slurry is prevented, and thus it is possible to make a high capacity nickel-based, manganese-based, or nickel-manganese-based positive electrode system battery.

Based on the Example 1 of the present invention, the following exemplary tests about the reliability and stability of the battery were conducted.

Standard Capacity Test

The battery made with the slurry of the Example 1 was charged with constant current/constant voltage of 0.5 C/4.2V for three hours, and the standard capacity thereof was measured.

Discharge Capacity Test

The battery made with the slurry of the Example 1 was charged with constant current/constant voltage of 0.5 C/4.2V for three hours, and was kept for two hours at a room temperature. The battery was, then, discharged with constant-current of 1 C/3V. The discharge capacity thereof was measured.

Overcharge Capacity Test

After the battery made with the slurry of the Example 1 was standard-charged at a normal temperature of 25° C., a state of the battery was observed while being charged with constant current/constant voltage of 6.5 A/10V for 2.5 hours. The test result is indicated with NG (NOT GOOD) or OK. Overcharge, high temperature short, penetration, collision, heat exposure, and compression of the battery were observed. As to the stability of the lithium rechargeable battery, if the appearance of the battery is not changed (L0) or the leakage of the battery is occurred (L1), it is considered that the battery passes the test. If high temperature, smoke, firing, or explosion is produced or occurred in the battery, it is considered that the battery fails the test.

The result obtained from the aforementioned exemplary tests is listed in the following Tables 1 and 2.

TABLE 1

| Test Item | | Specification | Number of Test | Average | Maximum | Minimum | Standard Deviation | Result |
| --- | --- | --- | --- | --- | --- | --- | --- | --- |
| Standard Capacity | | 1280 mAh ↑ | | 1376 | 1383 | 1373 | 2 | OK |
| Rated Capacity | | 1250 mAh ↑ | | 1307 | 1326 | 1298 | 6 | OK |
| Charging Rate | 2 A | 1250 mAh ↑ | 5 | 1283 | 1290 | 1276 | 5 | OK |
| | 4 A | 1250 mAh ↑ | | 1285 | 1293 | 1279 | 5 | OK |
| | 6 A | 1240 mAh ↑ | | 1288 | 1296 | 1281 | 6 | OK |
| | 8 A | 1240 mAh ↑ | | 1289 | 1298 | 1280 | 7 | OK |
| | 10 A | 1240 mAh ↑ | | 1285 | 1292 | 1279 | 6 | OK |
| Discharging Rate | 2 A | 1250 mAh ↑ | 5 | 1284 | 1287 | 1277 | 4 | OK |
| | 4 A | 1250 mAh ↑ | | 1276 | 1281 | 1269 | 5 | OK |
| | 6 A | 1240 mAh ↑ | | 1288 | 1293 | 1281 | 5 | OK |

TABLE 1-continued

| Test Item | | Specification | Number of Test | Average | Maximum | Minimum | Standard Deviation | Result |
|---|---|---|---|---|---|---|---|---|
| | 8 A | 1240 mAh ↑ | | 1306 | 1313 | 1300 | 5 | OK |
| | 10 A | 1240 mAh ↑ | | 1311 | 1318 | 1305 | 6 | OK |
| Drum Test | IR | 110% of the initial resistance | 6 | 105 | 107 | 102 | 2 | OK |
| | Recovery | 1188 mAh ↑ | | 1303 | 1305 | 1301 | 2 | OK |

As shown in Table 1, the results of the reliability test show that the battery of the Example 1 of the present invention has the higher average standard capacity, average rated capacity, maximum standard capacity, maximum rated capacity, minimum standard capacity, and minimum rated capacity. Hence, the test results prove that the gelation can be prevented and the high capacity can be realized with the positive electrode active material of the present invention.

TABLE 2

| Item | Specification | Number of Test | Result | Temperature (° C.) | | | OK/NG |
|---|---|---|---|---|---|---|---|
| | | | | Average | Maximum | Minimum | OK |
| 6.5 A/10 V Overcharge | L1 ↓ | 10 | L0 = 10 | 76 | 79 | 71 | OK |
| High Temperature Short | L1 ↓ | 10 | L0 = 10 | 71 | 73 | 69 | OK |
| Penetration | L1 ↓ | 10 | L1 = 10 | 78 | 84 | 73 | OK |
| Collision | L1 ↓ | 10 | L0 = 10 | — | — | — | OK |
| Heat Exposure | Maintaining for 10 Minutes, L1 ↓ | 10 | L1 = 10 | 155 | 157 | 154 | OK |
| Compression | L1 ↓ | 10 | L1 = 10 | — | — | — | OK |

As shown in Table 2, it is found that the stability of the battery of the Example 1 of the present invention is excellent. All ten batteries, which have been tested, are not changed in their appearance, or only the leakage thereof is occurred in the test items of overcharge, high temperature short, penetration, heat exposure, and compression. Hence, even though naphthaline-sulfonic acid is added as an antigelling agent, it is found that the naphthaline-sulfonic acid does not affect the stability of the battery.

According to the present invention, an advantageous effect is attained which can realize a high capacity battery system by using a nickel-based material, a manganese-based material or a nickel-manganese-based material as a positive electrode active material.

According to the present invention, the antigelling agent added positive electrode slurry does not affect the properties of the battery, and the positive electrode slurry maintains its fluidity without the gelation even though the positive electrode slurry is kept for a long time after fabricating the slurry. Therefore, an advantageous effect that a manufacturing process of the battery can be flexibly carried out is attained.

Although preferred embodiments of the present invention have been described for illustrative purpose, those skilled in the art will appreciate which various modifications and changes thereof are possible without departing from the scope and spirit of the present invention, and all modifications and changes are intended to be included within the description of the claims.

What is claimed is:

1. A positive electrode for a lithium rechargeable battery comprising:

a positive electrode collector; and a positive electrode active material layer formed on at least one side of the positive electrode collector, the positive electrode active material layer comprising:

a positive electrode active material that includes a lithium compound which intercalates and deintercalates a lithium ion, the positive electrode active material including a lithium compound selected from the group consisting of $Li_xMn_{1-y}M_yA_2$, $Li_xMn_{1-y}M_yO_{2-z}X_z$, $Li_xMn_2O_{4-z}X_z$, $Li_xMn_{2-y}M_yM'_zA_4$, $Li_xNi_{1-y}M_yA_2$, $Li_xNi_{1-y}M_yO_{2-z}X_z$, $Li_xNi_{1-y}Co_yO_{2-z}X_z$, $Li_xNi_{1-y-z}Co_yM_zA_a$, $Li_xNi_{1-y-z}Co_yM_zO_{2-a}X_a$, $Li_xNi_{1-y-z}Mn_yM_zA_a$, and $Li_xNi_{1-y-z}Mn_yM_zO_{2-a}X_a$, where $0.9 \leq x \leq 1.1$, $0 \leq y \leq 0.5$, $0 \leq z \leq 0.5$ and $0 \leq a \leq 2$; each of M and M' is one selected from the group consisting of magnesium (Mg), aluminum (Al), cobalt (Co), potassium (K), sodium (Na), calcium (Ca), silicon (Si), titanium (Ti), tin (Sn), vanadium (V), germanium (Ge), gallium (Ga), boron (B), arsenic (As), zirconium (Zr), manganese (Mn), chromium (Cr), iron (Fe), strontium (Sr), and the rear-earth elements; A is one selected from the group consisting of oxygen (O), fluorine (F), and sulfur (S); and X is one selected from the group consisting of fluorine (F), and sulfur (S);

a binder;

a surfactant including one selected from the group consisting of soap, alcohol sulfate ester salt, and alkyl/alkylaryl sulfonic acid salt; and an organic solvent dispersing the positive electrode active material, the binder and the surfactant.

2. The positive electrode for a lithium rechargeable battery as claimed in claim 1, comprised of the surfactant including naphthaline-sulfonic acid.

3. The positive electrode for a lithium rechargeable battery as claimed in claim 1, wherein the amount of the surfactant is about 0.1 wt % to about 5 wt % with respect to the weight of the positive electrode active material.

4. The positive electrode for a lithium rechargeable battery as claimed in claim 1, comprised of the binder including one selected from the group consisting of polyvinylidene fluoride, copolymer (P(VdF/HFP) of polyhexafluoropropylene-polyvinylidene fluoride, poly(vinyl acetate), polyvinyl alcohol, polyethylene oxide, polyvinyl pyrrolidone, alkylated polyethylene oxide, polyvinyl ether, poly(methyl metacrylate), poly(ethyl acrylate), polytetrafluoroethylene, polyvinyl chloride, polyacrylonitrile, polyvinylpyridine, styrene-butadiene rubber, and acrylonitrile-butadiene rubber.

5. The positive electrode for a lithium rechargeable battery as claimed in claim 1, wherein the amount of the binder is between about 1 wt % and about 10 wt % with respect to the weight of the positive electrode active material.

6. The positive electrode for a lithium rechargeable battery as claimed in claim 1, comprised of the positive electrode active material layer further comprising a conductive material.

7. The positive electrode for a lithium rechargeable battery as claimed in claim 6, comprised of the conductive material including a material selected from the group consisting of a graphite-based material, a carbon black-based material, an electrically conductive fiber, a metal powder, an electrically conductive metal oxide, an electrically conductive polymer, a metal, a metal compound, and mixtures thereof.

8. The positive electrode for a lithium rechargeable battery as claimed in claim 7, wherein
the graphite-based material includes artificial graphite or natural graphite;
the carbon black-based material includes one selected from the group consisting of acetylene black, ketjen black, denka black, thermal black, and channel black;
the electrically conductive fiber includes carbon fiber or metal fiber;
the metal powder includes one selected from the group consisting of copper, nickel, aluminum, and silver;
the electrically conductive metal oxide includes titanium oxide;
the electrically conductive polymer includes one selected from the group consisting of polyaniline, polythiophene, polyacetylene, and polypyrrole; and
the metal compound includes perovskite material that includes one selected from the group consisting of tin, tin oxide, tin phosphate ($SnPO_4$), titanium oxide, potassium titanate, $LaSrCoO_3$, and $LaSrMnO_3$.

9. The positive electrode for a lithium rechargeable battery as claimed in claim 6, wherein the amount of the conductive material is between about 0.1 wt % and about 10 wt % with respect to the weight of the positive electrode active material.

10. The positive electrode for a lithium rechargeable battery as claimed in claim 9, wherein the amount of the conductive material is about 1 wt % to about 5 wt % with respect to the positive electrode active material.

11. A lithium rechargeable battery comprising:
a positive electrode including a positive electrode collector and a positive electrode active material layer formed on at least one side of the positive electrode collector, the positive electrode active material layer comprising:
a positive electrode active material including a lithium compound which intercalates and deintercalates a lithium ion, the positive electrode active material including a lithium compound selected from the group consisting of $Li_xMn_{1-y}M_yA_2$, $Li_xMn_{1-y}M_yO_{2-z}X_z$, $Li_xMn_2O_{4-z}X_z$, $Li_xMn_{2-y}M_yM'_zA_4$, $Li_xNi_{1-y}M_yA_2$, $Li_xNi_{1-y}M_yO_{2-z}X_z$, $Li_xNi_{1-y}Co_yO_{2-z}X_z$, $Li_xNi_{1-y-z}Co_yM_zA_a$, $Li_xNi_{1-y-z}Co_yM_zO_{2-a}X_a$, $Li_xNi_{1-y-z}Mn_yM_zA_a$, and $Li_xNi_{1-y-z}Mn_yM_zO_{2-a}X_a$, where $0.9 \leq x \leq 1.1$, $0 \leq y \leq 0.5$, $0 \leq z \leq 0.5$ and $0 \leq a \leq 2$; each of M and M' is selected from the group consisting of magnesium (Mg), aluminum (Al), cobalt (Co), potassium (K), sodium (Na), calcium (Ca), silicon (Si), titanium (Ti), tin (Sn), vanadium (V), germanium (Ge), gallium (Ga), boron (B), arsenic (As), zirconium (Zr), manganese (Mn), chromium (Cr), iron (Fe), strontium (Sr), and the rear-earth elements; A is selected from the group consisting of oxygen (O), fluorine (F), and sulfur (S); and X is selected from the group consisting of fluorine (F), and sulfur (S);
a binder;
a surfactant including one selected from the group consisting of soap, alcohol sulfate ester salt, and alkyl/alkylaryl sulfonic acid salt; and
an organic solvent dispersing the positive electrode active material, the binder and the surfactant;
a negative electrode including a negative electrode active material that intercalates and deintercalates lithium ion; and
an electrolyte which transfers the lithium ion, the electrolyte contacting each of the positive electrode and the negative electrode.

12. The lithium rechargeable battery as claimed in claim 11, comprised of the surfactant including naphthaline-sulfonic acid.

13. The lithium rechargeable battery as claimed in claim 11, wherein the amount of the surfactant is about 0.1 wt % to about 5 wt % with respect to the weight of the positive electrode active material.

14. The lithium rechargeable battery as claimed in claim 11, comprised of the binder including one selected from the group consisting of polyvinylidene fluoride, copolymer (P(VdF/HFP) of polyhexafluoropropylene-polyvinylidene fluoride, poly(vinyl acetate), polyvinyl alcohol, polyethylene oxide, polyvinyl pyrrolidone, alkylated polyethylene oxide, polyvinyl ether, poly(methyl metacrylate), poly(ethyl acrylate), polytetrafluoroethylene, polyvinyl chloride, polyacrylonitrile, polyvinylpyridine, styrene-butadiene rubber, and acrylonitrile-butadiene rubber.

15. The lithium rechargeable battery as claimed in claim 11, wherein the amount of the binder is between about 1 wt % and about 10 wt % with respect to the weight of the positive electrode active material.

16. The lithium rechargeable battery as claimed in claim 11, comprised of the positive electrode active material layer further comprising a conductive material.

17. The lithium rechargeable battery as claimed in claim 16, comprised of the conductive material including a material selected from the group consisting of a graphite-based material, a carbon black-based material, an electrically conductive fiber, a metal powder, an electrically conductive metal oxide, an electrically conductive polymer, a metal, a metal compound, and mixtures thereof.

18. The lithium rechargeable battery as claimed in claim 17, wherein
the graphite-based material includes artificial graphite or natural graphite;

the carbon black-based material includes one selected from the group consisting of acetylene black, ketjen black, denka black, thermal black, and channel black;

the electrically conductive fiber includes carbon fiber or metal fiber;

the metal powder includes one selected from the group consisting of copper, nickel, aluminum, and silver;

the electrically conductive metal oxide includes titanium oxide;

the electrically conductive polymer includes one selected from the group consisting of polyaniline, polythiophene, polyacetylene, and polypyrrole; and the metal compound includes perovskite material that includes one selected from the group consisting of tin, tin oxide, tin phosphate ($SnPO_4$), titanium oxide, potassium titanate, $LaSrCoO_3$, and $LaSrMnO_3$.

19. The lithium rechargeable battery as claimed in claim 16, wherein the amount of the conductive material is between about 0.1 wt % and about 10 wt % with respect to the weight of the positive electrode active material.

20. The lithium rechargeable battery as claimed in claim 19, wherein the amount of the conductive material is about 1 wt % to about 5 wt % with respect to the positive electrode active material.

21. The lithium rechargeable battery as claimed in claim 11, comprised of the negative electrode active material including one selected from the group consisting of a material that reversibly intercalates and deintercalates a lithium ion, and a metal material that is capable of being alloyed with lithium and lithium mixtures.

22. The lithium rechargeable battery as claimed in claim 21, wherein the material that reversibly intercalates and deintercalates the lithium ion includes one selected from the group consisting of artificial graphite, natural graphite, graphite carbon fiber, graphite mezocarbon microbead, fullerene, and amorphous carbon.

23. The lithium rechargeable battery as claimed in claim 21, wherein the metal that is capable of being alloyed with lithium includes one selected from the group consisting of aluminum (Al), silicon (Si), tin (Sn), lead (Pb), zinc (Zn), bismuth (Bi), indium (In), magnesium (Mg), gallium (Ga), cadmium (Cd), and germanium (Ge).

24. A method of fabricating a lithium rechargeable battery comprising the steps of:

fabricating a positive electrode slurry by mixing a positive electrode active material with an organic solvent, a binder and a surfactant; the organic solvent dispersing the positive electrode active material, the binder and the surfactant, the surfactant, the positive electrode active material intercalating and deintercalating a lithium ion, the positive electrode active material including a lithium compound that includes nickel (Ni) or manganese (Mn), the positive electrode active material including a lithium compound selected from the group consisting of $Li_xMn_{1-y}M_yA_2$, $Li_xMn_{1-y}M_yO_{2-z}A_z$, $Li_xMn_2O_{4-z}X_z$, $Li_xMn_{2-y}M_yM'_zA_4$, $Li_xNi_{1-y}M_yA_2$, $Li_xNi_{1-y}M_yO_{2-z}X_z$, $Li_xNi_{1-y}Co_yO_{2-z}A_z$, $Li_xNi_{1-y-z}Co_yM_zA_a$, $Li_xNi_{1-y-z}Co_yM_zO_{2-a}X_a$, $Li_xNi_{1-y-z}Mn_yM_zA_a$, and $Li_xNi_{1-y-z}Mn_yM_zO_{2-a}X_a$, where $0.9 \leq x \leq 1.1$, $0 \leq y \leq 0.5$, $0 \leq z \leq 0.5$ and $0 \leq a \leq 2$; each of M and M' is selected from the group consisting of magnesium (Mg), aluminum (Al), cobalt (Co), potassium (K), sodium (Na), calcium (Ca), silicon (Si), titanium (Ti), tin (Sn), vanadium (V), germanium (Ge), gallium (Ga), boron (B), arsenic (As), zirconium (Zr), manganese (Mn), chromium (Cr), iron (Fe), strontium (Sr), and the rear-earth elements; A is selected from the group consisting of oxygen (O), fluorine (F), and sulfur (S); and X is selected from the group consisting of fluorine (F), and sulfur (S), the surfactant including one selected from the group consisting of soap, alcohol sulfate ester salt, and alkyl/alkylaryl sulfonic acid salt;

coating at least one side of a positive electrode collector with the positive electrode slurry to form a positive electrode active material layer formed on at least one side of the positive electrode collector; and drying and rolling the coated positive electrode slurry.

25. The method of fabricating a lithium rechargeable battery as claimed in claim 24, comprised of the surfactant including naphthaline-sulfonic acid.

26. The method of fabricating a lithium rechargeable battery as claimed in claim 24, comprised of the step of fabricating the positive electrode slurry further comprises a step of adding a conductive material into the positive electrode slurry.

27. The method of fabricating a lithium rechargeable battery as claimed in claim 24, wherein the amount of surfactant mixed in the positive electrode slurry is about 0.1 wt % to 5 wt % with respect to the weight of the positive electrode slurry.

* * * * *